(12) United States Patent
Antonov et al.

(10) Patent No.: US 8,768,757 B2
(45) Date of Patent: Jul. 1, 2014

(54) MUSIC-CENTRIC ADVERTISING USING SUPPORTIVE INFORMATION

(75) Inventors: Lyudmil Vladimirov Antonov, Harpers Ferry, WV (US); Syrak Amare Worku, Alexandria, VA (US)

(73) Assignee: Hulu, LLC, Santa Monica, CA (US)

( * ) Notice: Subject to any disclaimer, the term of this patent is extended or adjusted under 35 U.S.C. 154(b) by 1298 days.

(21) Appl. No.: 12/010,983

(22) Filed: Jan. 31, 2008

(65) Prior Publication Data

US 2008/0189167 A1   Aug. 7, 2008

Related U.S. Application Data

(60) Provisional application No. 60/899,019, filed on Feb. 2, 2007.

(51) Int. Cl.
*G06Q 30/00*   (2012.01)

(52) U.S. Cl.
USPC .......................................................... 705/14.1

(58) Field of Classification Search
USPC ................................ 705/10, 14, 14.12, 14.64
See application file for complete search history.

(56) References Cited

U.S. PATENT DOCUMENTS

| | | | | |
|---|---|---|---|---|
| 5,532,735 A * | 7/1996 | Blahut et al. | ..................... | 725/32 |
| 6,446,261 B1 * | 9/2002 | Rosser | ............................. | 725/34 |
| 6,574,594 B2 * | 6/2003 | Pitman et al. | ................. | 704/236 |
| 6,988,277 B2 * | 1/2006 | Kovac et al. | ..................... | 725/34 |
| 7,233,948 B1 * | 6/2007 | Shamoon et al. | ..................... | 1/1 |
| 7,336,890 B2 * | 2/2008 | Lu et al. | ......................... | 386/239 |
| 7,769,764 B2 * | 8/2010 | Ramer et al. | ................... | 707/751 |
| 7,975,310 B2 * | 7/2011 | Hydrie et al. | ................... | 726/27 |
| 8,090,619 B1 * | 1/2012 | Hunter et al. | ................ | 705/26.1 |
| 2002/0094787 A1 * | 7/2002 | Avnet et al. | ...................... | 455/68 |
| 2005/0203849 A1 * | 9/2005 | Benson | ............................ | 705/51 |

FOREIGN PATENT DOCUMENTS

WO    WO 0184823 A2 *   11/2001

OTHER PUBLICATIONS

Rulei Zhang, Ju Liu, Yuxia Gao, and Jianping Qiao; "A Realized Embedded Streaming Media System"; ICMMN2006 Proceedings; 2006; pp. 1-4.*

* cited by examiner

*Primary Examiner* — Ella Colbert
(74) *Attorney, Agent, or Firm* — Fountainhead Law Group P.C.

(57) ABSTRACT

The present invention is directed toward a method of advertising on a portable media device having video and audio capabilities comprising the steps of: (a) embedding a video advertisement on the supportive identification information of a music file; (b) downloading the music file to a portable media device with a video advertise so that playing the music file generates the display of a video advertisement; (c) tracking the play count of each music file with an associated video advertisement until the play count data reaches a certain fixed number; d) recording the play count of each music file in connection with each specific video advertisement; and (f) changing the advertisement in the embedded supportive information of the music file.

13 Claims, 4 Drawing Sheets

MUSIC-CENTRIC ADVERTISING USING SUPPORTIVE INFORMATION

RELATED APPLICATIONS

This application claims the benefit of Provisional Application No. 60/899,019, filed Feb. 2, 2007.

STATEMENT REGARDING FEDERALLY SPONSORED RESEARCH OR DEVELOPMENT

Not applicable.

REFERENCE TO SEQUENCE LISTING, A TABLE OR A COMPUTER PROGRAM LISTING COMPACT DISC APPENDIX

None.

FIELD OF INVENTION

The present invention is directed toward advertising, digital music and tracking listeners activity. More specifically, this invention relates to methods of advertising using digital music's supportive information and tracking user ad exposure using the number of times a song has been played.

BACKGROUND OF THE INVENTION

Any discussion of the prior art throughout the specification should in no way be considered as an admission that such prior art is widely known or forms part of common general knowledge in this field.

As digital music continues to increase in popularity, various methods of advertising have been attempted to make use of this new venue to reach out to music listeners. A common way of music advertising is embedding an advertisement inside the audio stream of a song. The listener is then exposed to the advertisement, whenever the music is played. However, this provides for an unpleasant experience for the user because it interferes with the integrity of the music. Moreover, the advertisement becomes obsolete with time.

Another way of advertising is obtaining and displaying an advertisement to the listener's monitor using specialized software to manipulate the advertisement. One such method is described in U.S. Pat. No. 6,970,834 issued Nov. 29, 2005. The problem with this approach is that specialized software or a machine needs to be physically in place for the advertising process to take place. The commercial is independent of the song, thus placing requirements on the listener to install and use specialized equipment to receive the advertisement and/or to play the desired song.

An issue with music-centric advertising is tracking the number of times an advertisement has been displayed. To achieve this tracking count, the described invention equates the number of times a song has been played (play counts) to the number of times an advertisement has been displayed.

Play counts are a commonly used technique and have been used in three primary approaches. The first approach is purely for personal accommodation, allowing listeners to distinguish between songs based on personal usage. The second approach is to determine royalties to be paid to record companies for providing songs that were played. This latter approach, though having relevance to this invention, does not constitute an advertising technique, nor is it used in any way to generate or account for ad exposure and/or ad revenue. A third approach outlined in U.S. Pat. No. 6,970,834 discussed above is to determine the total income from played songs knowing that listeners pay for every time they listen to a song. However, this approach is not advertisement related and is not used to track advertisement exposure, thus it is not relevant to the hereby listed invention.

A common advertising technique on the Internet is CPM (Cost-Per-Thousand-Impressions). The tracking of user exposure is done using impressions. The advertiser pays for every thousand times their banner has been displayed on the user's web browser. Whereas the proposed invention follows a similar paradigm, the advertisement process is not done using browsers or any Internet related matter. Although CPM is an integral part of web site advertising, it is not in any way associated with digital music and advertising on digital music. While it is effective for online advertisement it is hard for the music receiver to relate to offline music advertisement.

SUMMARY OF THE INVENTION

The present invention is directed toward a method of advertising on a portable media device having a digital screen and audio capabilities comprising the steps of:

(a) embedding a graphical advertisement such as a still image advertisement or a video advertisement on the supportive identification information of a music file containing a song;

(b) downloading the music file song to a portable media device with a graphical advertisement so that playing the song generates unmodified music while at the same time displaying a graphical advertisement exposing the user to the embedded advertisement;

(c) tracking the play count of each song with an associated graphical advertisement to establish a relation between the number of times a song has been played and the number of times an advertisement has been displayed until the play count data reaches a certain fixed number;

(d) recording the play count of each song in connection with each specific graphical advertisement; and (f) changing the advertisement in the embedded supportive information of the music file.

It is an object of the present invention to track the number of times a particular advertisement is actually run so that the advertiser can be appropriately billed.

It is yet another object of the present invention to provide a method for downloading and storing advertisements to portable media players and then running the advertisement on a screen associated with the portable media players.

It is yet another object of the present invention to provide a method utilizing modern computer technology to digitally store and play songs with associated advertising on portable media players.

An additional object of the present invention is to provide a method which is capable of recording the number of times each musical song and associated advertisement is played and award credits for play of a certain number of songs.

Other objects, features and advantages of the present invention will be apparent from the following description of the preferred embodiments taken in conjunction with the accompanying drawings, although variation and modifications may be effected without departing from the spirit and scope of the disclosure.

DESCRIPTION OF THE INVENTION

The best mode and preferred embodiment is shown in FIGS. 1-4.

Figure 1:
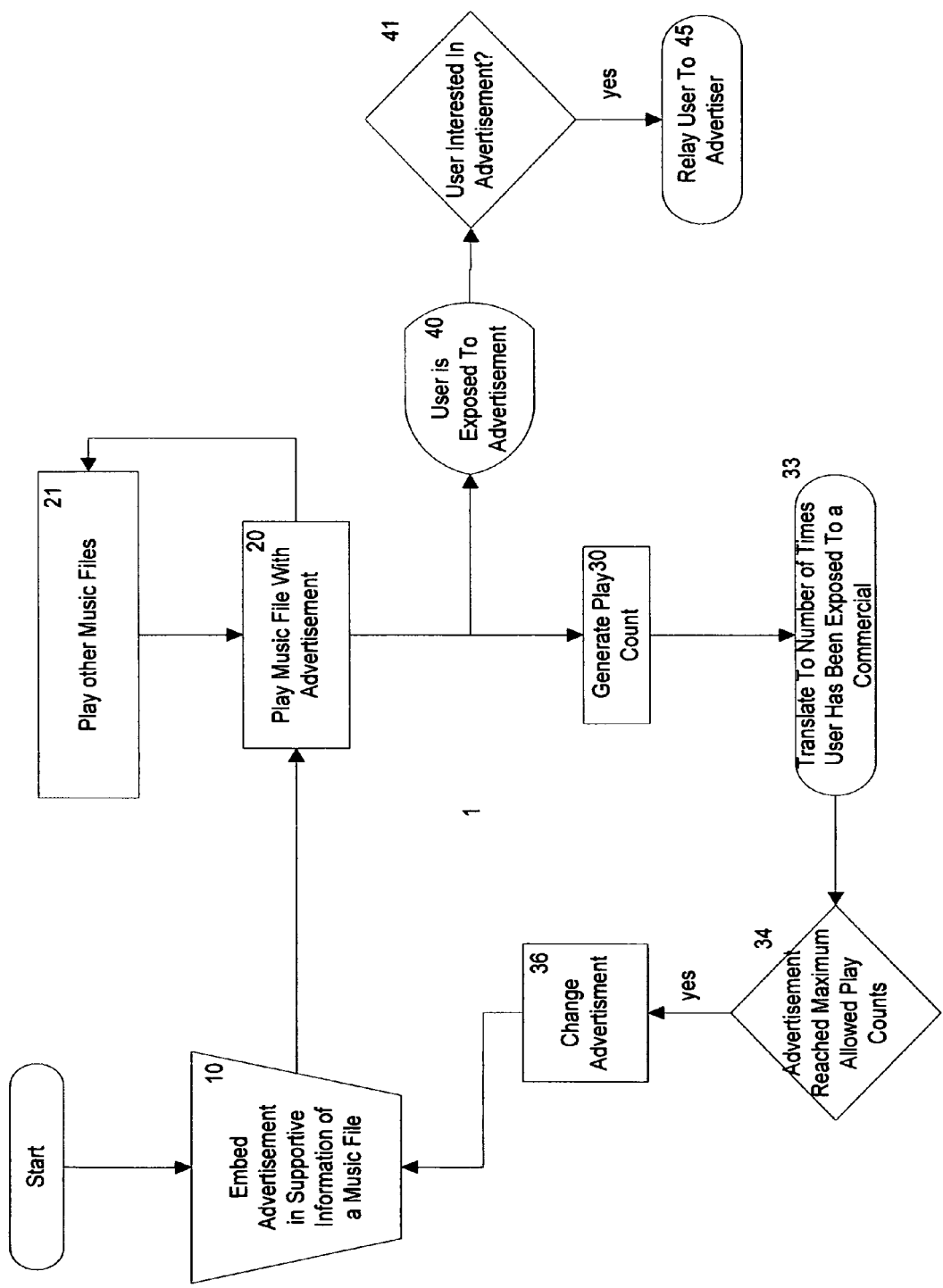
FIG. 1 is a schematic block diagram showing an overview of the music-centric advertising process.

As is shown in FIG. 1, the advertising process 1, is started by embedding an advertisement in a music file's supportive information 10, then playing the advertisement enabled music file 20, among other music files 21, on a software media player or a portable media device. This generates play counts 30, and exposes users to a commercial 40, while giving them the option 41 upon taking interest in the advertisement to be relayed to an advertiser's interface 45; at the same time generating play counts 30, translates into number of times a user has been exposed to a commercial 33, which upon reaching a maximum allowed exposure limit 34, triggers an advertising change 36 to become embedded in a music file's supportive information 10.

The use of supportive information is essential to the proposed invention for the automatic visualization of the embedded advertisement which is then downloaded or transmitted to the portable media device. The album art field, because of its graphical nature, is one of best placeholders for commercial contents. As such it constitutes the preferred embodiment of this invention. However, all supportive information fields such as text, graphics, motion, or sounds; examples of which are song title, artist, album, etc, could be used as carriers for an advertisement.

It should be understood that the tracking mechanism of using play counts is the preferred embodiment, as it establishes a relation between number of times a song has been played and number of times an ad has been displayed. Any other tracking mechanism, such as skip counts, play time or amount of time the advertisement is active on a file, could be used to account for the listener's exposure to advertisements.

Switching of advertisements upon reaching a maximum allowed play counts, is the preferred embodiment of an ad-switching algorithm. Other switching processes, such as timeline driven alternation, or any other previously described alternative tracking methods, could be used to carry this task.

Figure 2:
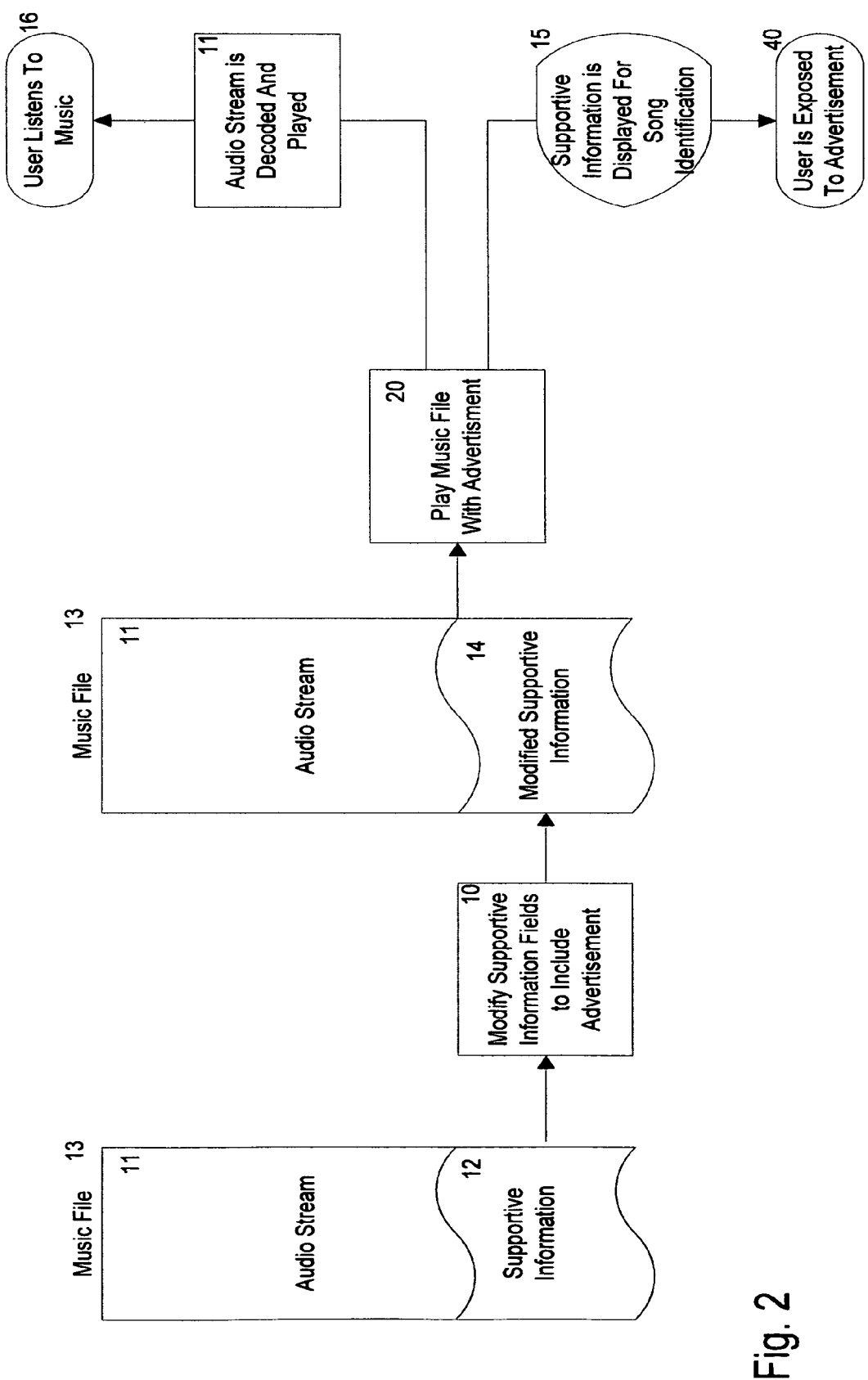
FIG. 2 is a schematic block diagram showing how the advertisement is carried to the listener.

Advertisement Placement and Display: In FIG. 2 the music file 13, constitutes an audio stream 11, and supportive identification information fields 12, the latter of which are modified 14 by a process 10 to include an advertisement, such that when the music file with advertisement 20 is played, the original audio stream 11 is decoded and the user listens to unmodified music 16. At the same time the music player or portable device displays the advertisement enabled supportive identification information 15, so that ultimately the user 40 is exposed to the embedded advertisement while playing 16 the unmodified music audio stream 11.

The supportive identification information of a music file is usually contained within the music file itself as illustrated in FIG. 2. Although this is the preferred embodiment of the described invention, the supportive identification information of a music file can be stored at different locations all of which constitute alternative embodiments of the invention. Such locations include, but are not limited to, remote or local files, databases, network nodes and other accessible data retrieving locations. Furthermore, while it is the preferred embodiment of this invention that all supportive identification information is stored at a single location, this is not necessarily always the case and supportive information fields could be distributed upon various accessible data retrieving locations.

Figure 3:
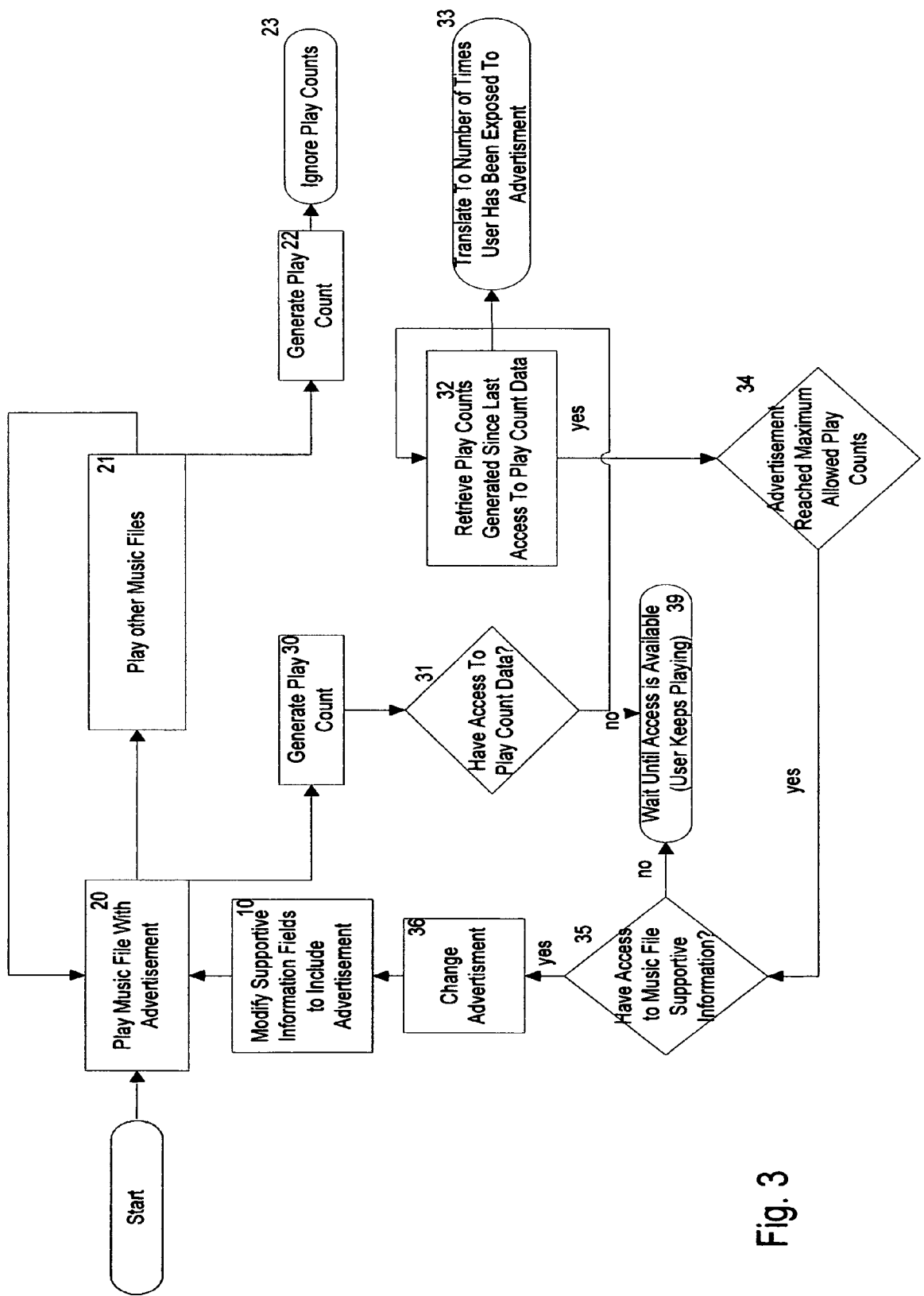
FIG. 3 is a schematic block diagram showing how the tracking of advertisement exposure is done using play counts, as well as a description of the switching of advertisements upon reaching maximum allowed exposure.

In FIG. 3 the user tracking process starts with playing a music file with an advertisement 20 among other music files 21, whose play counts 22 are ignored 23 due to a lack of advertisement in files 21, generating a play count 30 every time it is played, the sum of which upon gaining access to the play count data 31 are retrieved 32 and translated to the number of times the user has been exposed to the advertisement 33; reaching maximum allowed exposure time (play counts) 34, and having access 35 to the music file's supportive information. This triggers the advertising change 36 in the embedded supportive information of advertising 10. The tracking method in FIG. 3 is an offline process which is resilient to the lack of immediate access 39 to key data 31 and 35, ultimately allowing for the overall play process to continue until access is gained.

It should be understood that play counts as described in the process are generated and accessible via the music player software or via the portable device, which is the preferred embodiment of the invention. An alternative approach is to have the play counts stored in the actual music file 13 or at a separate independent data location and be accessed from there. The generation 30 of play counts could be alternatively achieved by instructions stored within the music file itself or tallying by independent software/hardware, as opposed to the described preferred embodiment.

Figure 4:
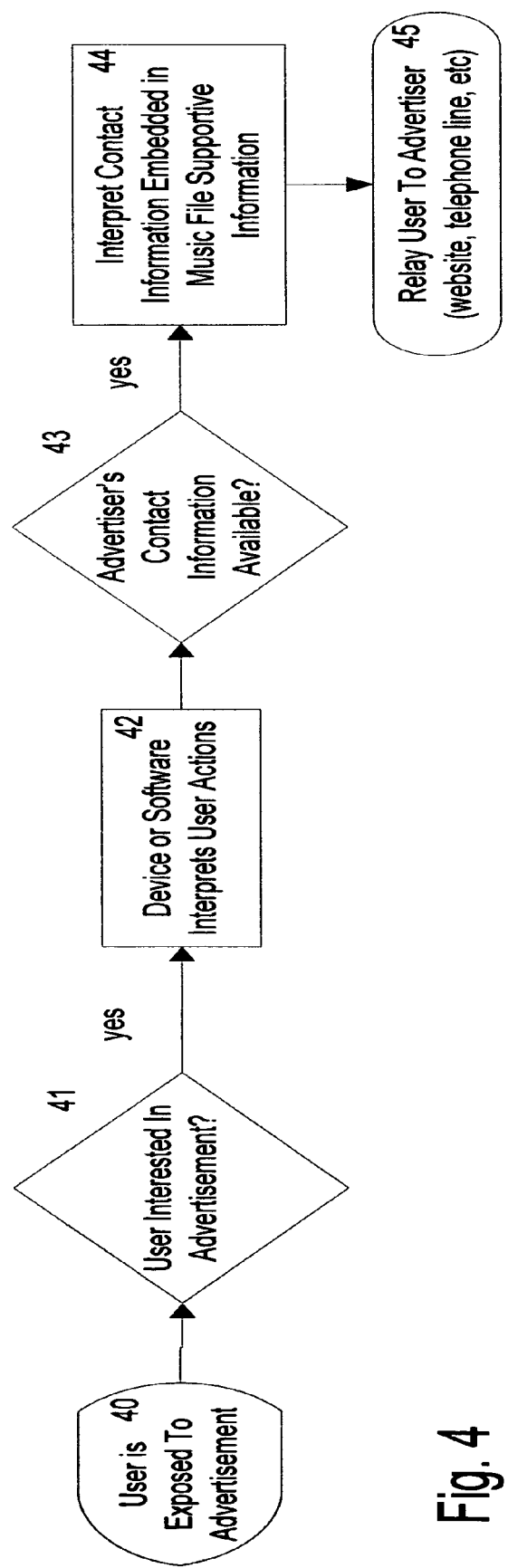
FIG. 4 is a schematic block diagram showing how a user can establish direct connection with an advertiser, using the proposed advertisement method.

As shown in FIG. 4, during the listener's exposure 40 to an advertisement, the user can take an interest in the advertisement 41 and provide input, which when interpreted by the hardware device or software 42, can cause contact information 43 to be retrieved and interpreted 44, if available, from the embedded supportive information stored in the music file. This will result in the relaying of a user to an advertisers interface 45.

Upon user interaction and proper interpretation, the invention can relay a user from the current interface to an advertiser's website or to establish other means of direct communication with a marketer. It is the preferred embodiment of the invention that the user expresses his or her interest to an advertisement by clicking on it or on fields associated with it. However, alternative human-computer interaction interfaces such as touch screens, touch pads, keyboards, point-and-click devices, multi-touch screen technology and other interfaces can be used to achieve the same effect. Relaying the user to an advertiser's interface as described in the invention refers to finding the advertiser's web site within the supportive information of a music file, opening and displaying it. Contact information could, however, be in an alternative form such as a phone or address in which case the software or portable device can call or give directions to a marketer's location.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What is claimed is:

1. A method of advertising on a portable media device having a digital screen and audio capabilities comprising:

embedding a graphical advertisement in supportive identification information of a music file containing a song;

downloading the music file to a portable media device with the graphical advertisement so that playing the music file generates an unmodified version of the song while at the same time displaying the graphical advertisement on the portable media player;

tracking a play count of the song with the graphical advertisement by counting a number of times the song is played on the portable media player while being accompanied by display of the graphical advertisement, until the play count reaches a predetermined number; recording the play count; and changing to another advertisement in the embedded supportive information of the music file, based at least in part on the play count.

2. The method of advertising as claimed in claim 1, wherein changing to another advertisement is performed in response to an amount of time the graphical advertisement is displayed on the portable media player.

3. The method of advertising as claimed in claim 1, wherein changing to another advertisement is performed in response to the play count reaching a limit.

4. The method of advertising as claimed in claim 1, further comprising storing the play count in the music file on the portable media device.

5. The method of advertising as claimed in claim 1, further comprising storing the play count at a separate independent data location.

6. The method of advertising as claimed in claim 1, further comprising providing contact information in the graphical advertisement embedded in the music file, whereby the portable media device to connects to an advertiser's interface.

7. The method of advertising as claimed in claim 6, further comprising directing the portable media device to the advertiser's interface at a marketing web site.

8. The method of advertising as claimed in claim 7, further comprising providing voice-mediated marketing at the marketing web site.

9. The method of advertising as claimed in claim 1, further comprising storing the supportive identification information at a remote location.

10. The method of advertising as claimed in claim 1, further comprising displaying the graphical advertisement in an album art field.

11. The method of advertising as claimed in claim 1, further comprising displaying the graphical advertisement in a song title field.

12. The method of advertising as claimed in claim 1, further comprising displaying the graphical advertisement in an artist name field.

13. The method of advertising as claimed in claim 1, further comprising storing the supportive identification information of said music file at different locations consisting of local files, databases, and network nodes.

* * * * *